(12) United States Patent
Howard (10) Patent No.: US 7,282,832 B2
(45) Date of Patent: Oct. 16, 2007

(54) AXIALLY-EXPANDABLE EM SHIELD

(75) Inventor: Raymond T. Howard, Franklin, MA (US)

(73) Assignee: American Superconductor Corporation, Westborough, MA (US)

( * ) Notice: Subject to any disclaimer, the term of this patent is extended or adjusted under 35 U.S.C. 154(b) by 1051 days.

(21) Appl. No.: 09/956,328

(22) Filed: Sep. 19, 2001

(65) Prior Publication Data
US 2003/0052568 A1    Mar. 20, 2003

(51) Int. Cl.
*H02K 1/22* (2006.01)
*H02K 9/00* (2006.01)

(52) U.S. Cl. .................. 310/261; 310/52; 505/878; 505/166

(58) Field of Classification Search .......... 310/261, 310/52, 58, 215, 254; 505/878
See application file for complete search history.

(56) References Cited

U.S. PATENT DOCUMENTS

| 4,092,555 | A | * | 5/1978 | Ying et al. ............. 310/52 |
| 4,117,357 | A | * | 9/1978 | Baumann ............... 310/52 |
| 4,176,291 | A | * | 11/1979 | Rabinowitz ............ 310/52 |
| 4,295,068 | A | * | 10/1981 | Gamble ................. 310/52 |
| 4,532,445 | A | * | 7/1985 | Iwamoto et al. ....... 310/52 |
| 4,820,945 | A | * | 4/1989 | Khutoretsky et al. .. 310/52 |
| 5,880,547 | A | * | 3/1999 | Shoykhet ............... 310/91 |
| 6,590,305 | B2 | * | 7/2003 | Wang et al. ............ 310/54 |
| 6,597,082 | B1 | * | 7/2003 | Howard et al. ........ 310/261 |
| 6,617,714 | B2 | * | 9/2003 | Laskaris ................ 310/54 |

FOREIGN PATENT DOCUMENTS

JP         08242573 A   *  9/1996

* cited by examiner

*Primary Examiner*—Burton Mullins
*Assistant Examiner*—Erik Preston
(74) *Attorney, Agent, or Firm*—Occhiuti Rohlicek & Tsao LLP (57) ABSTRACT

A superconducting rotating machine includes a stator assembly having at least one stator coil assembly. A rotor assembly, which includes an axial shaft, is configured to rotate within the stator assembly. The rotor assembly includes at least one superconducting winding assembly. A first and second end plate are rigidly attached to the axial shaft at distal ends of the at least one superconducting winding assembly. An asynchronous field filtering shield surrounds the at least one superconducting winding assembly. A first interconnection assembly connects the shield to the first end plate. The first interconnection assembly allows for axial movement between the shield and the first end plate but restricts tangential movement between the same.

45 Claims, 4 Drawing Sheets

AXIALLY-EXPANDABLE EM SHIELD

GOVERNMENT RIGHTS

This invention was made with U.S. government support under Contract Nos.: N00014-99-C-0296 and N00014-00-C-0486 awarded by the Office of Naval Research. The Government may have certain rights in the subject invention.

RELATED APPLICATIONS

The following applications are here hereby incorporated by reference into the subject application as if set forth herein in full: (1) U.S. application Ser. No. 09/632,599, filed Aug. 4, 2000, entitled "Superconducting Synchronous Machine Field Winding Protection"; (2) U.S. application Ser. No. 09/632,602, filed Aug. 4, 2000, entitled "Segmented Rotor Assembly For Superconducting Rotating Machines"; (3) U.S. application Ser. No. 09/632,600, filed Aug. 4, 2000, entitled "Exciter For Superconducting Rotating Machinery"; (4) U.S. application Ser. No. 09/632,601, filed Aug. 4, 2000, entitled "Stator Support Assembly For Superconducting Rotating Machines"; (5) U.S. application Ser. No. 09/480,430, filed Jan. 11, 2000, entitled "Exciter and Electronic Regulator for Rotating Machinery"; (6) U.S. application Ser. No. 09/481,480, filed Jan. 11, 2000, entitled "Internal Support for Superconducting Wires"; (7) U.S. Ser. No. 09/480,396, filed Jan. 11, 2000, entitled "Cooling System for HTS Machines"; (8) U.S. application Ser. No. 09/415,626, filed Oct. 12, 1999, entitled "Superconducting Rotating Machine"; (9) U.S. application Ser. No. 60/266,319, filed Jan. 11, 2000, entitled "HTS Superconducting Rotating Machine"; and U.S. application Ser. No. 09/905,611, filed Jul. 13, 2001, entitled "Enhancement of Stator Leakage Inductance in Air-Core Machines".

TECHNICAL FIELD

This invention relates to superconducting machines.

BACKGROUND

Superconducting air-core, synchronous electric machines have been under development since the early 1960's. The use of superconducting windings in these machines has resulted in a significant increase in the field electromotive forces generated by the windings and increased flux and power densities of the machines.

Early superconducting machines included field windings wound with low temperature superconductor (LTS) materials, such as NbZr or NbTi and later with $Nb_3Sn$. The field windings were cooled with liquid helium from a stationary liquifier. The liquid helium was transferred into the rotor of the machine and then vaporized to use both the latent and sensible heat of the fluid to cool the windings. This approach proved to be viable for only very large synchronous machines. With the advent of high temperature superconductor (HTS) materials in the 1980's, the cooling requirements of these machines were greatly reduced and smaller superconducting machines were realizable.

In superconducting machinery, efficiency and size are of critical importance. One way of reducing the size of a superconducting machine is to minimize the air gap between the field windings and the stator windings. Superconducting rotor windings typically utilize some form of metallic shielding between these windings to minimize the detrimental affect of asynchronous fields from the stator windings. Unfortunately, during hi-load use and various fault conditions, this metallic shield will be exposed to considerable amounts of thermal loading. This thermal loading can be problematic, as the shield (which is typically constructed of aluminum and rigidly attached to the axial ends of the rotor) will want to expand along the axis of the rotor.

SUMMARY

According to an aspect of this invention, a superconducting rotating machine includes a stator assembly having at least one stator coil assembly. A rotor assembly, which includes an axial shaft, is configured to rotate within the stator assembly. The rotor assembly includes at least one superconducting winding assembly which, in operation, generates a magnetic flux linking the stator assembly with the rotor assembly. A first end plate and a second end plate are rigidly attached to the axial shaft at distal ends of the at least one superconducting winding assembly. An asynchronous field filtering shield surrounds the at least one superconducting winding assembly. A first interconnection assembly connects the shield to the first end plate. The first interconnection assembly allows for axial movement between the shield and the first end plate but restricts tangential movement between the same.

One or more of the following features may also be included. The first interconnection assembly includes radial splines positioned about the perimeter of the first end plate, and axial keyways positioned about a distal end of the shield. The radial splines engage the axial keyways. The first interconnection assembly is configured to allow for radial movement between the shield and the first end plate. The second end plate is rigidly attached to the shield.

The superconducting rotating machine further includes a second interconnection assembly for connecting the shield to the second end plate. The second interconnection assembly allows for axial movement between the shield and the second end plate but restricts tangential movement between the same. The second interconnection assembly includes a plurality of radial splines positioned about the perimeter of the second end plate, and a plurality of axial keyways positioned about a distal end of the shield. This plurality of radial splines engages the plurality of axial keyways. The second interconnection assembly is configured to allow for radial movement between the shield and the second end plate. The superconducting rotating machine further includes a vacuum chamber sleeve which surrounds the at least one superconducting winding assembly and is positioned between the shield and the at least one superconducting winding assembly. The distal ends of the sleeve are rigidly attached to the end plates of the rotor assembly. An air-tight chamber is formed surrounding the at least one superconducting winding assembly.

The asynchronous field filtering shield is constructed of a non-magnetic material. The non-magnetic material is copper or aluminum. The at least one stator coil assembly is constructed using a copper non-superconducting material. The at least one superconducting rotor winding assembly is constructed using a high-temperature superconducting material. The high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide. The superconducting rotating machine further includes a refrigeration system for cooling the at least one superconducting rotor winding assembly.

The first end plate is a multi-part end plate. This multi-part end plate includes an outer radial portion connected to the first interconnection assembly, an inner radial portion connected to the axial shaft; and an interlocking assembly for removably attaching the outer radial portion and the inner radial portion. The second end plate is a multi-part end plate. This multi-part end plate includes an outer radial portion connected to the second interconnection assembly, an inner radial portion connected to the axial shaft; and an interlocking assembly for removably attaching the outer radial portion and the inner radial portion.

According to a further aspect of this invention, a superconducting rotating machine includes a stator assembly having at least one stator coil assembly. A rotor assembly, which includes an axial shaft, is configured to rotate within the stator assembly. The rotor assembly includes at least one superconducting winding assembly which, in operation, generates a magnetic flux linking the stator assembly with the rotor assembly. An asynchronous field filtering shield surrounds the at least one superconducting winding assembly. A first and second end plate are rigidly attached to distal ends of the shield. A first interconnection assembly connects the first end plate to the axial shaft. The first interconnection assembly allows for axial movement between the axial shaft and the first end plate but restricts tangential movement between the same.

One or more of the following features may also be included. The first interconnection assembly includes a plurality of radial splines positioned about the perimeter of the axial shaft, and a plurality of axial keyways positioned about an inner circumference of the first end plate. This plurality of radial splines engages the plurality of axial keyways. The first interconnection assembly is configured to allow for radial movement between the axial shaft and the first end plate. The second end plate is rigidly attached to the axial shaft. The superconducting rotating machine further includes a second interconnection assembly for connecting the second end plate to the axial shaft. The second interconnection assembly allows for axial movement between the axial shaft and the second end plate but restricts tangential movement between the same. The second interconnection assembly includes a plurality of radial splines positioned about the perimeter of the axial shaft, and a plurality of axial keyways positioned about an inner circumference of the second end plate. This plurality of radial splines engages the plurality of axial keyways. The second interconnection assembly is configured to allow for radial movement between the axial shaft and the second end plate. The superconducting rotating machine further includes a vacuum chamber which surrounds the at least one superconducting winding assembly and is positioned between the shield and the at least one superconducting winding assembly. The distal ends of the chamber are rigidly attached to the axial shaft. An air-tight chamber is formed surrounding the at least one superconducting winding assembly.

The asynchronous field filtering shield is constructed of a non-magnetic material. The non-magnetic material is copper or aluminum. The at least one stator coil assembly is constructed using a copper non-superconducting material. The at least one superconducting rotor winding assembly is constructed using a high-temperature superconducting material. The high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide. The superconducting rotating machine further includes a refrigeration system for cooling the at least one superconducting rotor winding assembly.

The first end plate is a multi-part end plate. This multi-part end plate includes an outer radial portion connected to the shield, an inner radial portion connected to the first interconnection assembly, and an interlocking assembly for removably attaching the outer radial portion and the inner radial portion.

One or more advantages can be provided from the above aspects of the invention. The ability of a superconducting machine to withstand high thermal loads is increased. Accordingly, the ability of the superconducting machine to tolerate fault conditions and high load situations is also increased. By allowing for axial expansion of the asynchronous field filtering shield, shield deformation can be reduced. This deformation reduction allows for a decrease in the likelihood of mechanical failure resulting from the contact of the rotor and stator assemblies. Accordingly, the overall size of the superconducting machine can also be reduced and the magnetic flux linkage can be increased.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
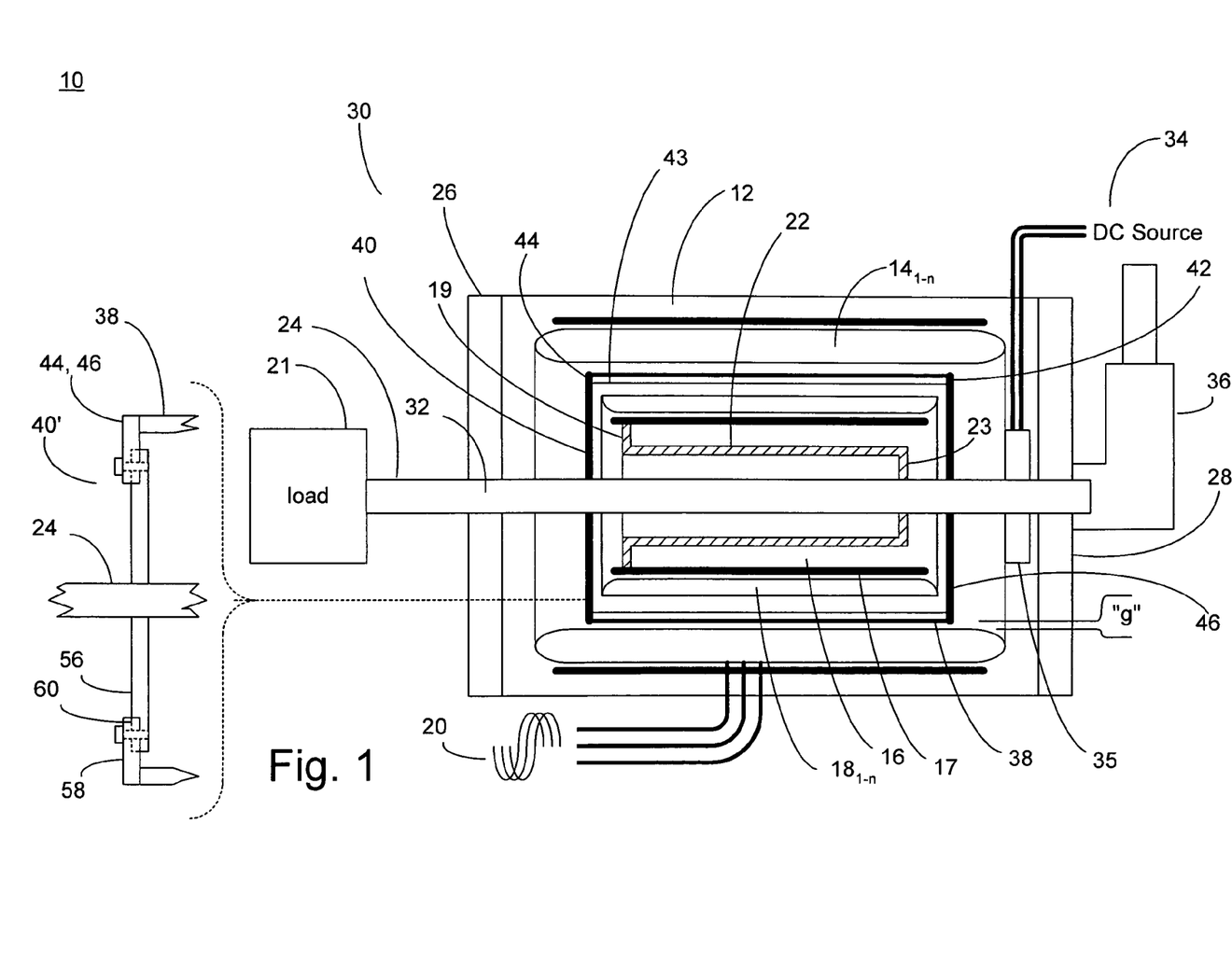
FIG. 1 is a cross-sectional side view of a first embodiment of a superconducting rotating machine.

Referring to FIG. 1, a superconducting rotating machine 10 has a stator assembly 12 including stator coil assemblies $14_{1-n}$. As is well known in the art, the specific number of stator coil assemblies $14_{1-n}$ included within stator assembly 12 varies depending on various design criteria, such as whether the machine is a single phase or a polyphase machine. For example, in one 33,000 horsepower superconducting machine design, stator assembly 12 includes one hundred and eighty stator coil assemblies $14_{1-n}$.

A rotor assembly 16 rotates within stator assembly 12. As with stator assembly 12, rotor assembly 16 includes rotor winding assemblies $18_{1-n}$. In the same 33,000 horsepower superconducting machine design, rotor assembly 16 includes twelve rotor winding assemblies $14_{1-n}$. These rotor winding assemblies, during operation, generate a magnetic flux that links rotor assembly 16 and stator assembly 12.

During operation of superconducting rotating machine 10, a balanced polyphase voltage 20 is supplied to stator coil assemblies $14_{1-n}$ This, in turn, brings machine 10 up to its operating speed, which is proportional to the frequency of supply voltage 20.

Accordingly, if the frequency of supply voltage 20 is held constant, machine 10 (i.e., rotor assembly 16) will rotate at a constant (or synchronous) speed. The torque generated by this now-rotating rotor assembly 16 is transferred to a load 21 (e.g., a propeller shaft of a boat, a conveyor belt on a production line, the drive wheels of a diesel locomotive, etc.). The rotor winding assemblies $18_{1-n}$ are mounted on a support structure 17 which is connected to a first flange 19 that transfers the motor torque to a torque tube 22. Torque tube 22 is connected to a second flange 23, which is connected to an output shaft 24. Flanges 19 and 23 may be incorporated into torque tube 22 or may be separate assemblies.

Output shaft 24 is supported by a pair of bearing plates 26, 28, one at each end of rotor assembly 16. The bearing plate 26 on the drive end 30 of superconducting rotating machine 10 contains a passage 32 through which output shaft 24 passes. Additionally, bearing plate 28 may also have a passage through which the output shaft 24 passes. Bearing plates 26, 28 position rotor assembly 16 at the proper position within stator assembly 12 so that rotor assembly 16 can freely rotate within stator assembly 12 while maintaining the proper gap "g" between rotor assembly 16 and stator assembly 12.

During operation of superconducting rotating machine 10, field energy 34 is applied to rotor winding assembly $18_{1-n}$ through a slip ring/rotating disk assembly 35. This signal can be in the form of a DC current. Rotor winding assemblies $18_{1-n}$, require DC current to generate the magnetic field (and the magnetic flux) required to link the rotor assembly 16 and stator assembly 12. Therefore, if field energy 34 is supplied in the form of an AC current, a rectifier/thyristor circuit (not shown) will be employed to convert the AC current into a DC current.

While stator coil assemblies $14_{1-n}$ are non-superconducting copper coil assemblies, rotor winding assemblies $18_{1-n}$ are superconducting assemblies incorporating either HTS (High Temperature Superconductor) or LTS (Low Temperature Superconductor) windings. Examples of LTS conductors are: niobium-zirconium; niobium-titanium; and niobium-tin. Examples of HTS conductors are: thallium-barium-calcium-copper-oxide; bismuth-strontium-calcium-copper-oxide; mercury-barium-calcium-copper-oxide; and yttrium-barium-copper-oxide.

As these superconducting conductors only achieve their superconducting characteristics when operating at low temperatures, superconducting machine 10 includes a refrigeration system 36. Refrigeration system 36 is typically in the form of a cryogenic cooler that maintains the operating temperature of rotor winding assemblies $18_{1-n}$ at an operating temperature sufficiently low to enable the conductors to exhibit their superconducting characteristics. Since rotor winding assemblies $18_{1-n}$ must be kept cool by refrigeration system 36, torque tube 22 may be constructed from a high strength, low thermal conductivity metallic material (such as Inconel™) or composite material (such as G-10 phenolic or woven-glass epoxy).

Rotor assembly 16 includes an asynchronous field filtering shield 38 positioned between stator assembly 12 and rotor assembly 16. As rotor assembly 16 is typically cylindrical in shape, asynchronous field filtering shield 38 is also typically cylindrical in shape. Stator assembly 12 is typically powered by multiphase AC power or pulse-width modulated (PWM) power 20 at a frequency commensurate with the desired shaft speed. This, in turn, generates a rotating magnetic field that rotates about the axis of the cylindrically-shaped stator assembly 12. As stated above, the frequency of the multiphase AC power 20 supplied to stator assembly 12 proportionally controls the rotational speed of superconducting machine 10. Since AC or PWM signals naturally contain harmonics of their primary frequency (e.g., odd multiples of a 60 Hertz signal), it is desirable to shield the rotor winding assemblies $18_{1-n}$ of rotor assembly 16 from these asynchronous fields. Accordingly, asynchronous field filtering shield 38, which is fitted to rotor assembly 16, covers (or shields) rotor winding assemblies $18_{1-n}$ from the asynchronous fields generated as a result of these harmonics present in three-phase AC power 20. Asynchronous field filtering shield 38 is constructed of a non-magnetic material (e.g., copper, aluminum, etc.) and should be of a length sufficient to fully cover and shield rotor winding assemblies $18_{1-n}$. In a preferred embodiment, asynchronous field filtering shield 38 is constructed of 6061 T6 structural aluminum. The thickness of shield 38 varies inversely with respect to the frequency of the three-phase AC power 20 supplied to stator assembly 12, which is typically in the range of 2-120 Hertz. Typically, the thickness of shield 38 varies from ½-3 inches depending on this supply frequency.

Shield 38 is connected to output shaft 24 via a pair of end plates 40, 42. These end plates 40, 42 are rigidly connected to output shaft 24. This rigid connection can be in the form of a weld or a mechanical fastener system (e.g., bolts, rivets, splines, keyways, etc.).

A vacuum chamber sleeve 43 surrounds the rotor winding assemblies $18_{1-n}$. This vacuum chamber sleeve 43 is positioned between shield 38 and the rotor winding assemblies $18_{1-n}$, and is connected on its distal ends to end plate 40, 42. This connection can be in the form of a weld or a mechanical fastener system (e.g., bolts, rivets, splines, keyways, etc.). Typically, vacuum chamber sleeve 43 is relatively thin (e.g., 3/16") and is constructed of stainless steel. When vacuum chamber sleeve 43 is connected to the end plates, an air-tight chamber is formed which encloses the rotor winding assemblies $18_{1-n}$. This air-tight chamber can then be evacuated, thus forming a vacuum within the chamber. This helps to insulate the rotor winding assemblies $18_{1-n}$ (which are superconducting and kept cool) from output shaft 24 (which is warm).

As stated above, a gap "g" exists between stator assembly 12 and rotor assembly 16. In order to reduce the size of superconducting rotating machine 10, it is desirable to reduce the dimensions of this gap (or spacing) to a minimum allowable value. In the same 33,000 horsepower superconducting machine, this gap "g" has a value of over one inch. Specifically, due to the maximization of the flux linkage, the efficiency of machine 10 is maximized when gap "g" is minimized. Unfortunately, when gap "g" is minimized, shield 38 gets very close to the windings of stator coil assembly $14_{1-n}$.

During operation of superconducting rotating machine 10, shield 38 will heat up as a result of eddy current heating caused by the presence of the asynchronous fields described above. As metals (especially aluminum) are known to expand when heated, it is important that rotor assembly 16 be capable of accommodating this expansion. This expansion can occur in two dimensions, both axially (i.e., along the direction of the output shaft 24) and radially (i.e., along the direction of the rotor assembly's radius). Accordingly, rotor assembly 16 includes a pair of interconnection assemblies 44, 46 for connecting shield 38 to end plates 40, 42. These interconnections devices 44, 46 compensate for the thermal expansion of shield 38 by allowing for axial movement between shield 38 and end plates 40, 42.

It is important to note that while these interconnection assemblies 44, 46 allow for axial movement, they restrict tangential movement between shield 38 and end plates 40, 42. Accordingly, this prohibits the rotation of shield 38 around rotor assembly 16 during a fault condition (described below).

It is also important to note that while rotor assembly 16 has been described as including two interconnections devices 44, 46, this is for illustrative purposes only and is not intended to be a limitation of the invention. Specifically, a single interconnection assembly can be utilized to compensate for the thermal expansion described above. If this embodiment is utilized, a rigid connection can be made between one of the end plates 40, 42 and shield 38. This rigid connection can be in the form of a weld or a mechanical fastener system (e.g., bolts, rivets, splines, keyways, etc.).

It is important to note that a superconducting rotating machine 10 during a fault condition (i.e., all phases of stator assembly 12 shorted to ground) will essentially function as a generator, exposing the torque path (i.e., the path through which torque is transferred from superconducting rotating machine 10 to load 21) to a considerable torque load. Additionally, shield 38 will be exposed to a considerable torque load. Accordingly, end plates 40, 42 and interconnection assemblies 44, 46 need to be capable of transferring the torque load experienced by shield 38 to output shaft 24 (i.e., the interconnection assemblies 44, 46 need to be capable of restricting tangential movement).

Figure 2:
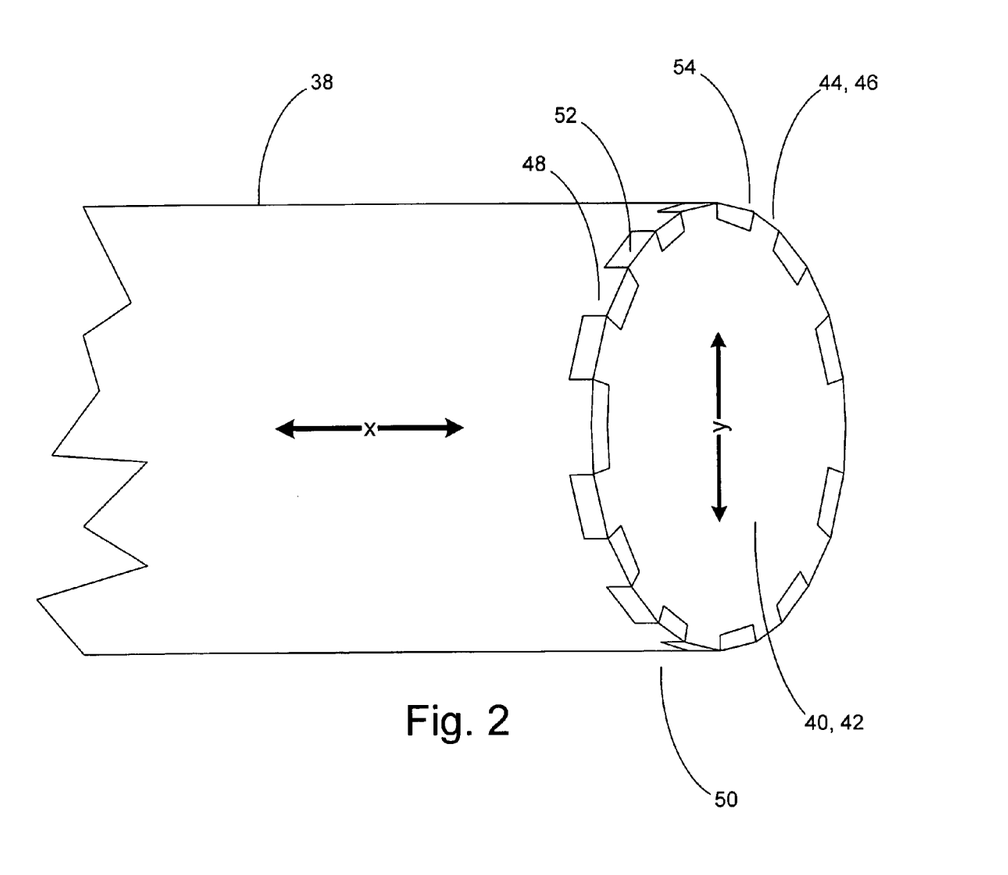
FIG. 2 is an isometric view of a rotor assembly of the superconducting rotating machine of FIG. 1.

Referring to FIGS. 1 and 2, the details of a particular embodiment of the interconnection assemblies 44, 46, as shown in FIG. 1 and described above, are shown. In this particular embodiment, shield 38 includes axial keyways 48 positioned at a distal end 50 of shield 38. A matching set of splines 52 is positioned about the perimeter 54 of end plate 40, 42. In this configuration, keyways 48 intermesh and engage splines 52 so that shield 38 can slide over the perimeter 54 of end plate 40, 42 in the direction of "x". Additionally, this configuration allows for radial expansion of shield 38 in the direction of "y".

While thus far, end plates 40, 42 have been shown as being a single solitary unit, this is not intended to be a limitation of this invention, as a multi-part endplate 40' may be employed. Multi-part end plate 40' includes an inner radial portion 56 (attached to shaft 24) and an outer radial portion 58 (attached to interconnection assembly 44, 46). These portions 56, 58 are held together by an interlocking assembly 60. Interlocking assembly 60 will have to be strong enough to withstand the torque load of superconducting rotating machine 10. For example, in low-torque applications, interlocking assembly 60 may simply be several bolts which attach inner radial portion 56 and outer radial portion 58. However, in high-torque applications, interlocking assembly 60 may also employ a combination of keyways/splines in addition to the bolts. The use of multi-part end plate 40' allows for easier servicing of superconducting rotating machine 10, as outer radial portion 58 may be disconnected from inner radial portion 56, thus allowing for the removal of shield 38 from rotor assembly 16.

Figure 3:
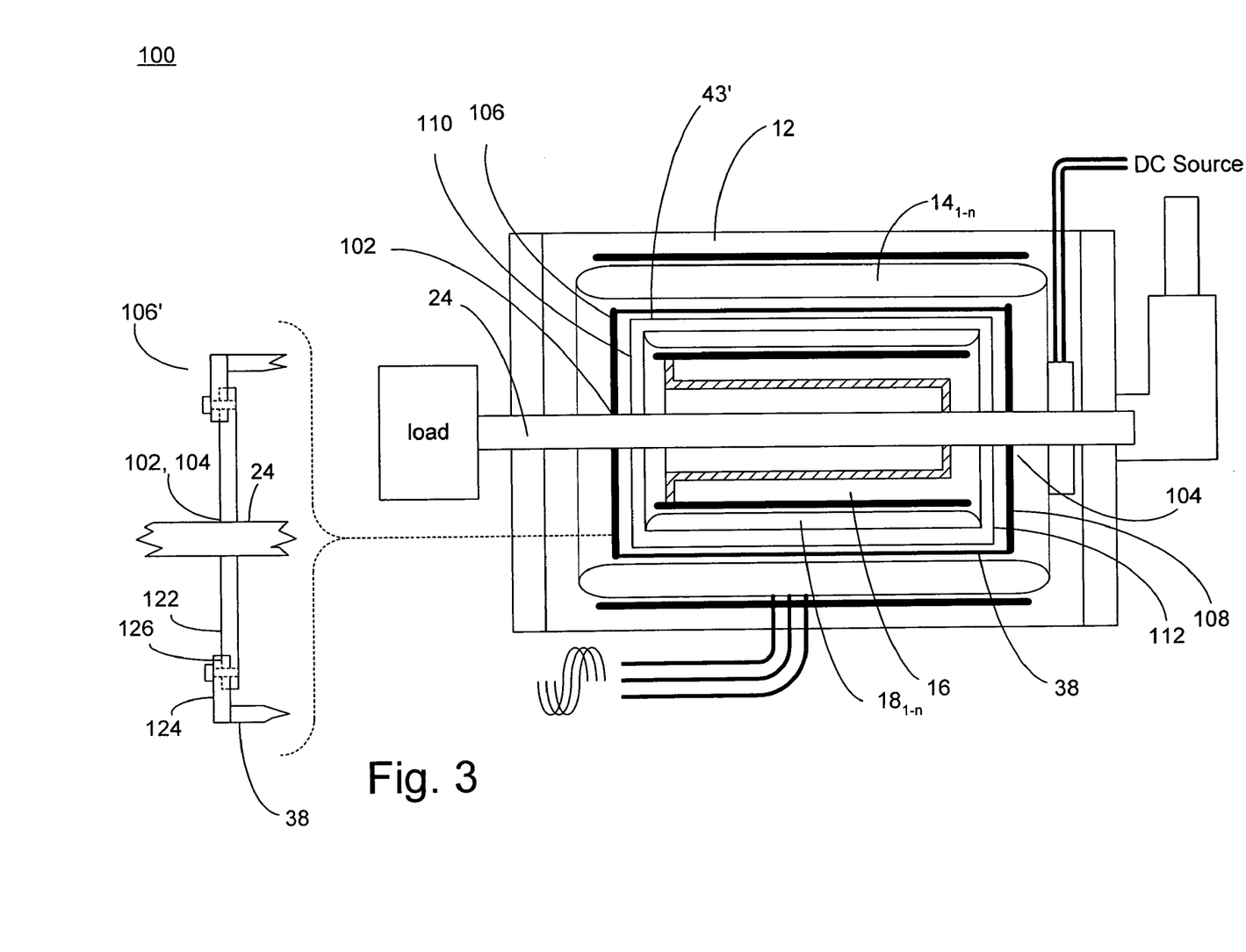
FIG. 3 is a cross-sectional side view of a second embodiment of a superconducting rotating machine.

Referring to FIG. 3, there is shown an alternative embodiment of the superconducting rotating machine 100 which utilizes a different style interconnection assembly 102, 104. In this embodiment, interconnection assemblies 102, 104 allow axial movement between the output shaft 24 and the endplates 106, 108 but restrict tangential movement between the same. As endplate(s) 106, 108 slide freely over output shaft 24, these end plates are not capable of holding a vacuum. Accordingly, vacuum chamber sleeve 43' must be constructed differently than in the previous embodiment.

Vacuum chamber sleeve 43' includes a pair of end sections 110, 112 which connect the distal ends of sleeve 43' directly to output shaft 24. This, in turn, allows for the creation of the air tight chamber which surrounds the rotor winding assemblies $18_{1-n}$.

Figure 4:
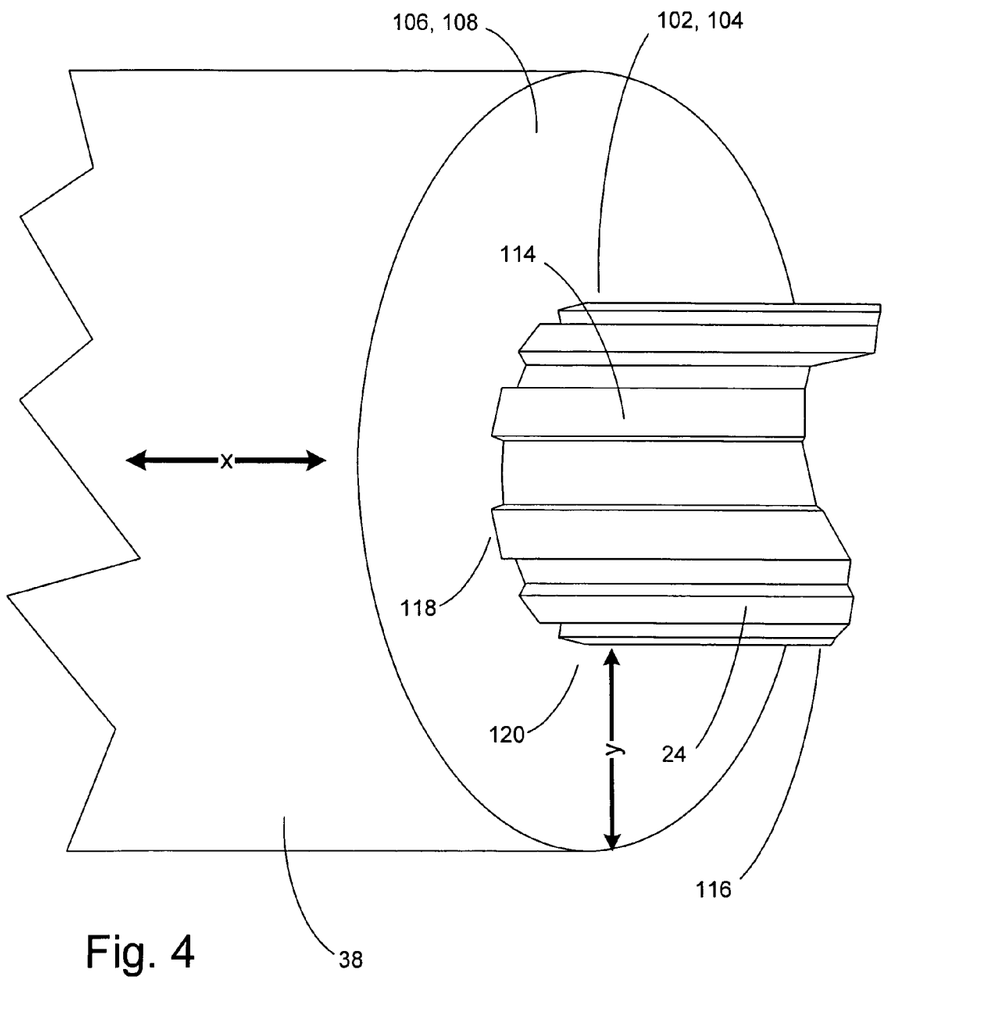
FIG. 4 is an isometric view of a rotor assembly of the superconducting rotating machine of FIG. 2.

Referring to FIGS. 3 and 4, the details of a particular embodiment of interconnection assemblies 102, 104 are shown. In this particular embodiment, shield 38 is rigidly attached to end plates 106, 108. The form of this rigid attachment can be a weld or a mechanical fastener system (e.g., bolts, rivets, splines, keyways, etc.). Output shaft 24 includes a plurality of radial splines 114 positioned about the perimeter 116 of axial shaft 24. A plurality of axial keyways 118 are positioned about the inner circumference 120 of end plates 106, 108. In this configuration, keyways 118 intermesh and engage splines 114 so that end plates 106, 108 can slide over the perimeter 116 of axial shaft 24 in the direction of "x". Additionally, this configuration allows for radial expansion of shield 38 in the direction of "y".

While thus far, end plates 106, 108 have been shown as being a single solitary unit, this is not intended to be a limitation of this invention, as a multi-part endplate 106' may be employed. Multi-part end plate 106' includes an inner radial portion 122 (attached to interconnection assembly 102, 104) and an outer radial portion 124 (attached to shield 38). These portions 122, 124 are held together by an interlocking assembly 126. Interlocking assembly 126 will have to be strong enough to withstand the torque load of superconducting rotating machine 10. For example, in low-torque applications, interlocking assembly 126 may simply be several bolts which attach inner radial portion 122 and outer radial portion 124. However, in high-torque applications, interlocking assembly 126 may also employ a combination of keyways/splines in addition to the bolts. The use of multi-part end plate 106' allows for easier servicing of superconducting rotating machine 10, as outer radial portion 124 may be disconnected from inner radial portion 122, thus allowing for the removal of shield 38 from rotor assembly 16.

A number of embodiments of the invention have been described. Nevertheless, it will be understood that various modifications may be made without departing from the spirit and scope of the invention. Accordingly, other embodiments are within the scope of the following claims.

What is claimed is:

1. A superconducting rotating machine comprising:
   a stator assembly including at least one stator coil assembly; and
   a rotor assembly, including an axial shaft, which is configured to rotate within said stator assembly, said rotor assembly including:
      at least one superconducting winding assembly;
      a first end plate and a second end plate, each being rigidly attached to said axial shaft at distal ends of said at least one superconducting winding assembly;
      an asynchronous field filtering shield which surrounds said at least one superconducting winding assembly; and
      a first interconnection assembly for connecting said shield to said first end plate, said first interconnection assembly being configured to allow axial movement between said shield and said first end plate and restrict tangential movement between said shield and said first end plate;
   wherein the superconducting rotating machine further comprises a vacuum chamber sleeve which surrounds said at least one superconducting winding assembly and is positioned between said shield and said at least one superconducting winding assembly, wherein the distal ends of said sleeve are rigidly attached to said end plates of said rotor assembly.

2. The superconducting rotating machine of claim 1 wherein said first interconnection assembly includes:
   a plurality of radial splines positioned about the perimeter of said first end plate; and
   a plurality of axial keyways positioned about a distal end of said shield, such that said plurality of radial splines engages said plurality of axial keyways.

3. The superconducting rotating machine of claim 1 wherein said first interconnection assembly is configured to allow for radial movement between said shield and said first end plate.

4. The superconducting rotating machine of claim 1 wherein said second end plate is rigidly attached to said shield.

5. The superconducting rotating machine of claim 1 further comprising a second interconnection assembly for connecting said shield to said second end plate, said second interconnection assembly being configured to allow axial movement between said shield and said second end plate and restrict tangential movement between said shield and said second end plate.

6. The superconducting rotating machine of claim 5 wherein said second interconnection assembly includes:
   a plurality of radial splines positioned about the perimeter of said second end plate; and
   a plurality of axial keyways positioned about a distal end of said shield, such that said plurality of radial splines engages said plurality of axial keyways.

7. The superconducting rotating machine of claim 5 wherein said second interconnection assembly is configured to allow for radial movement between said shield and said second end plate.

8. The superconducting rotating machine of claim 1 wherein said asynchronous field filtering shield is constructed of a non-magnetic material.

9. The superconducting rotating machine of claim 8 wherein said non-magnetic material is copper.

10. The superconducting rotating machine of claim 8 wherein said non-magnetic material is aluminum.

11. The superconducting rotating machine of claim 1 wherein said at least one stator coil assembly is constructed using a copper non-superconducting material.

12. The superconducting rotating machine of claim 1 wherein said at least one superconducting rotor winding assembly is constructed using a high-temperature superconducting material.

13. The superconducting rotating machine of claim 12 wherein said high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide.

14. The superconducting rotating machine of claim 1 further comprising a refrigeration system for cooling said at least one superconducting rotor winding assembly.

15. The superconducting rotating machine of claim 1 wherein said first end plate is a multi-part end plate, said multi-part end plate including:
   an outer radial portion connected to said first interconnection assembly;
   an inner radial portion connected to said axial shaft; and
   an interlocking assembly for removably attaching said outer radial portion and said inner radial portion.

16. A superconducting rotating machine comprising:
   a stator assembly including at least one stator coil assembly; and
   a rotor assembly, including an axial shaft, which is configured to rotate within said stator assembly, said rotor assembly including:
      at least one superconducting winding assembly;
      a first end plate and a second end plate, each being rigidly attached to said axial shaft at distal ends of said at least one superconducting winding assembly;
      an asynchronous field filtering shield which surrounds said at least one superconducting winding assembly;
      a first interconnection assembly for connecting said shield to said first end plate, said first interconnection assembly being configured to allow axial movement between said shield and said first end plate and restrict tangential movement between said shield and said first end plate; and
      a second interconnection assembly for connecting said shield to said second end plate, said second interconnection assembly being configured to allow axial movement between said shield and said second end plate and restrict tangential movement between said shield and said second end plate;
   wherein said first end plate is a multi-part end plate, said multi-part end plate including:
      an outer radial portion connected to said first interconnection assembly;
      an inner radial portion connected to said axial shaft; and
      an interlocking assembly for removably attaching said outer radial portion and said inner radial portion.

17. The superconducting rotating machine of claim 16 wherein said first interconnection assembly includes:
   a plurality of radial splines positioned about the perimeter of said first end plate; and
   a plurality of axial keyways positioned about a distal end of said shield, such that said plurality of radial splines engages said plurality of axial keyways.

18. The superconducting rotating machine of claim 16 wherein said second interconnection assembly includes:
   a plurality of radial splines positioned about the perimeter of said second end plate; and
   a plurality of axial keyways positioned about a distal end of said shield, such that said plurality of radial splines engages said plurality of axial keyways.

19. The superconducting rotating machine of claim 16 wherein said second end plate is a multi-part end plate, said multi-part end plate including:
   an outer radial portion connected to said second interconnection assembly;
   an inner radial portion connected to said axial shaft; and
   an interlocking assembly for removably attaching said outer radial portion and said inner radial portion.

20. A superconducting rotating machine comprising:
   a stator assembly including at least one stator coil assembly; and
   a rotor assembly, including an axial shaft, which is configured to rotate within said stator assembly, said rotor assembly including:
      at least one superconducting winding assembly;
      an asynchronous field filtering shield which surrounds said at least one superconducting winding assembly;
      a first end plate and a second end plate, each being rigidly attached to distal ends of said shield; and
      a first interconnection assembly for connecting said first end plate to said axial shaft, said first interconnection assembly being configured to allow axial movement between said axial shaft and said first end plate and restrict tangential movement between said axial shaft and said first end plate;

wherein the superconducting rotating machine further comprises a vacuum chamber sleeve which surrounds said at least one superconducting winding assembly and is positioned between said shield and said at least one superconducting winding assembly, wherein the distal ends of said sleeve are rigidly attached to said end plates of said rotor assembly.

21. The superconducting rotating machine of claim 20 wherein said first interconnection assembly includes:
   a plurality of radial splines positioned about the perimeter of said axial shaft; and
   a plurality of axial keyways positioned about an inner circumference of said first end plate, such that said plurality of radial splines engages said plurality of axial keyways.

22. The superconducting rotating machine of claim 20 wherein said first interconnection assembly is configured to allow for radial movement between said axial shaft and said first end plate.

23. The superconducting rotating machine of claim 20 wherein said second end plate is rigidly attached to said axial shaft.

24. The superconducting rotating machine of claim 20 further comprising a second interconnection assembly for connecting said second end plate to said axial shaft, said second interconnection assembly being configured to allow axial movement between said axial shaft and said second end plate and restrict tangential movement between said axial shaft and said second end plate.

25. The superconducting rotating machine of claim 24 wherein said second interconnection assembly includes:
   a plurality of radial splines positioned about the perimeter of said axial shaft; and
   a plurality of axial keyways positioned about an inner circumference of said second end plate, such that said plurality of radial splines engages said plurality of axial keyways.

26. The superconducting rotating machine of claim 24 wherein said second interconnection assembly is configured to allow for radial movement between said axial shaft and said second end plate.

27. The superconducting rotating machine of claim 20 wherein said asynchronous field filtering shield is constructed of a non-magnetic material.

28. The superconducting rotating machine of claim 27 wherein said non-magnetic material is copper.

29. The superconducting rotating machine of claim 27 wherein said non-magnetic material is aluminum.

30. The superconducting rotating machine of claim 20 wherein said at least one stator coil assembly is constructed using a copper non-superconducting material.

31. The superconducting rotating machine of claim 20 wherein said at least one superconducting rotor winding assembly is constructed using a high-temperature superconducting material.

32. The superconducting rotating machine of claim 31 wherein said high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide.

33. The superconducting rotating machine of claim 20 further comprising a refrigeration system for cooling said at least one superconducting rotor winding assembly.

34. The superconducting rotating machine of claim 20 wherein said first end plate is a multi-part end plate, said multi-part end plate including:
   an outer radial portion connected to said shield;
   an inner radial portion connected to said first interconnection assembly; and
   an interlocking assembly for removably attaching said outer radial portion and said inner radial portion.

35. A superconducting rotor assembly comprising:
   an axial shaft;
   at least one superconducting winding assembly;
   a first end plate and a second end plate, each being rigidly attached to said axial shaft at distal ends of said at least one superconducting winding assembly;
   an asynchronous field filtering shield which surrounds said at least one superconducting winding assembly; and
   a first interconnection assembly for connecting said shield to said first end plate, said first interconnection assembly being configured to allow axial movement between said shield and said first end plate and restrict tangential movement between said shield and said first end plate;
   wherein the superconducting rotor assembly further comprises a vacuum chamber sleeve which surrounds at least one superconducting winding assembly and is positioned between said shield and said at least one superconducting winding assembly, wherein the distal ends of said sleeve are rigidly attached to said end plates.

36. The superconducting rotor assembly of claim 35 wherein said first interconnection assembly includes:
   a plurality of radial splines positioned about the perimeter of said first end plate; and
   a plurality of axial keyways positioned about a distal end of said shield, such that said plurality of radial splines engages said plurality of axial keyways.

37. The superconducting rotor assembly of claim 35 wherein said first interconnection assembly is configured to allow for radial movement between said shield and said first end plate.

38. The superconducting rotor assembly of claim 35 wherein said second end plate is rigidly attached to said shield.

39. The superconducting rotor assembly of claim 35 further comprising a second interconnection assembly for connecting said shield to said second end plate, said second interconnection assembly being configured to allow axial movement between said shield and said second end plate and restrict tangential movement between said shield and said second end plate.

40. The superconducting rotor assembly of claim 39 wherein said second interconnection assembly includes:
   a plurality of radial splines positioned about the perimeter of said second end plate; and
   a plurality of axial keyways positioned about a distal end of said shield, such that said plurality of radial splines engages said plurality of axial keyways.

41. The superconducting rotor assembly of claim 39 wherein said second interconnection assembly is configured to allow for radial movement between said shield and said second end plate.

42. The superconducting rotor assembly of claim 35 wherein said first end plate is a multi-part end plate, said multi-part end plate including:
   an outer radial portion connected to said first interconnection assembly;
   an inner radial portion connected to said axial shaft; and an interlocking assembly for removably attaching said outer radial portion and said inner radial portion.

43. A superconducting rotor assembly comprising:
an axial shaft;
at least one superconducting winding assembly;
a first end plate and a second end plate, each being rigidly attached to said axial shaft at distal ends of said at least one superconducting winding assembly;
an asynchronous field filtering shield which surrounds said at least one superconducting winding assembly; and
a first interconnection assembly for connecting said shield to said first end plate, said first interconnection assembly being configured to allow axial movement between said shield and said first end plate;
wherein said first end plate is a multi-part end plate, said multi-part end plate including:
an outer radial portion connected to said first interconnection assembly;
an inner radial portion connected to said axial shaft; and
an interlocking assembly for removably attaching said outer radial portion and
said inner radial portion.

44. The superconducting rotor assembly of claim 43 wherein said first interconnection assembly is configured to restrict tangential movement between said shield and said first end plate.

45. The superconducting rotor assembly of claim 43 further comprising a second interconnection assembly for connecting said shield to said second end plate, said second interconnection assembly being configured to allow axial movement between said shield and said second end plate and restrict tangential movement between said shield and said second end plate.

* * * * *